US006623319B2

United States Patent
Isogawa (10) Patent No.: US 6,623,319 B2
(45) Date of Patent: Sep. 23, 2003

(54) COWLING AND VENTILATION SYSTEM FOR OUTBOARD MOTOR

(75) Inventor: Atsushi Isogawa, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/906,967

(22) Filed: Jul. 16, 2001

(65) Prior Publication Data

US 2003/0013360 A1 Jan. 16, 2003

(30) Foreign Application Priority Data

Jul. 14, 2000 (JP) ........................................ 2000-215160

(51) Int. Cl.$^7$ ............................................... B63H 21/26
(52) U.S. Cl. ........................................................ 440/77
(58) Field of Search ........................ 123/195 P; 440/77

(56) References Cited

U.S. PATENT DOCUMENTS

| | | |
|---|---|---|
| 4,403,971 A | 9/1983 | Kobayashi et al. |
| 4,721,485 A | 1/1988 | Suzuki |
| 4,734,070 A | 3/1988 | Mondek |
| 4,968,276 A | 11/1990 | Hashimoto |
| 4,978,321 A | 12/1990 | Ferguson |
| 5,069,644 A | 12/1991 | Kobayashi et al. |
| 5,181,870 A | 1/1993 | Arai et al. |
| 5,181,871 A | 1/1993 | Hiraoka et al. |
| 5,328,395 A | 7/1994 | Oishi |
| 5,445,547 A | 8/1995 | Furukawa |
| 5,492,089 A | 2/1996 | Hiraoka et al. |
| 5,503,577 A | 4/1996 | Ming et al. |
| 5,713,772 A | 2/1998 | Takahashi et al. |
| 5,743,228 A | 4/1998 | Takahashi |
| 5,873,755 A | 2/1999 | Takahashi et al. |
| 5,899,778 A | 5/1999 | Hiraoka et al. |
| 5,938,491 A | 8/1999 | Kawai et al. |
| 6,095,877 A | 8/2000 | Kawamukai et al. |
| 6,132,273 A | 10/2000 | Nakayama et al. |
| 6,213,829 B1 | 4/2001 | Takahashi et al. |

OTHER PUBLICATIONS

Copending patent application; Ser. No. 09/870,802, filed May 31, 2001, titled Cowling Arrangement for Outboard Motor, in the name of Goichi Katayama.

Copending patent application; Ser. No. 09/669,040, filed Sep. 25, 2001, titled Intake System for Outboard Motor, in the names of Takaji Kawai, Hitoshi Ishida, Masanori Takahashi, Sadato Yoshida, Masaki Okazaki.

Copending patent application; Ser. No. 09/559,863, filed Apr. 27, 2000, titled Cowling Assembly for Outboard Motor, in the names of Goichi Katayama, Takaji Kawai, Masanori Takahashi, Hitoshi Ishida.

*Primary Examiner*—Ed Swinehart
(74) *Attorney, Agent, or Firm*—Knobbe, Martens, Olson & Bear, LLP.

(57) ABSTRACT

An outboard motor includes a cowling substantially enclosing an engine therein. The engine has an air induction device for introducing air to a combustion chamber, and an exhaust system for communicating exhaust products away from the combustion chamber. The air induction device has an intake opening near a front end of the engine. The cowling has an air inlet at a rear portion of the cowling. An air guide member is disposed between the cowling air inlet and an engine cover, which is positioned atop the engine. The air guide member and engine cover cooperate to direct air toward a rear and center of the engine.

43 Claims, 6 Drawing Sheets

COWLING AND VENTILATION SYSTEM FOR OUTBOARD MOTOR

PRIORITY INFORMATION

This application is based on and claims priority to Japanese Patent Application No. 2000-215160, filed Jul. 14, 2000, the entire contents of which are hereby expressly incorporated by reference.

BACKGROUND OF THE INVENTION

1. Field of the Invention

The present invention generally relates to a ventilation arrangement for an outboard motor, and more particularly relates to a cowling air inlet arrangement for an outboard motor.

2. Description of the Related Art

Outboard motors are often powered by internal combustion engines. The engine is typically positioned within a substantially enclosed cowling. The engine is generally vertically arranged, so that a crankshaft thereof may extend downwardly in driving relation with a water propulsion device of the motor, such as a propeller. In order to balance the motor, and because of space considerations, the engine is arranged with a crankcase of the engine facing in the direction of a watercraft to which the motor is mounted (i.e., positioned on a front side of the engine) and with the cylinder head positioned on an end of the engine facing away from the watercraft (i.e., positioned on a rear side of the engine).

Four-cycle internal combustion engines tend to have advantageous emission control and high performance relative to two-cycle internal combustion engines. Accordingly, it is becoming popular for outboard motors to employ such four-cycle internal combustion engines. Typically, the four-cycle engine has intake and exhaust ports, both of which communicate with a combustion chamber. Typical engine arrangements usually position the intake ports along a side of the engine. Intake pipes supply intake air to the intake ports and extend along the side of the engine. Throttle bodies are usually positioned along the intake pipes. The intake ports and the intake pipes form at least a portion of an induction system.

Air must be supplied to the engine through the cowling for combustion. The cowling is sometimes divided into an engine compartment and an air guide chamber, with an air vent in the cowling communicating with the air guide chamber. Outside air is supplied to the engine through the air vent and the air guide chamber. Thus, ambient air is drawn through the air vent and the enclosed air guide chamber to the induction system. In order to inhibit the direct entry of water through the air vent into the intake system, the air vent generally is positioned away from the intake system, typically in the end of the engine facing away from the watercraft.

Certain four-cycle engine components, such as the throttle bodies, that are typically positioned on the side of the engine, are especially sensitive to corrosion that may occur when water enters the cowling through the intake duct and splashes onto the component. For example, corrosion may damage a rotating throttle valve shaft, thus disrupting smooth operation of the throttles. Additionally, when used in a marine environment, water contacting the moving components (i.e., throttle valve shafts) can leave mineral deposits that can hamper proper movement.

A need therefore exists for an improved water preclusion arrangement for an outboard motor, which arrangement will protect vulnerable engine components from contact with water and will also reduce water ingestion by the engine.

SUMMARY OF THE INVENTION

In accordance with one aspect, the present ventilation arrangement includes an outboard motor comprising a cowling substantially enclosing an internal combustion engine. The engine comprises an air intake system and an engine cover. The intake system has an intake opening disposed near a front end of the engine. The engine cover is disposed above an upper end of the engine. The cowling has an air inlet formed through an upper rear end of the cowling. An air guide member comprises a base plate disposed between the air inlet and the engine cover. The base plate has an air duct extending therethrough. The air duct is offset from a longitudinal center line of the engine and opens above the engine cover. A transverse base plate rib extends downward from the base plate at a location forward of the air duct. A pair of longitudinal base plate ribs extend downward from the base plate and are connected to the transverse base plate rib such that the air duct is interposed therebetween. A transverse cover rib extends upward from the cover proximate the transverse base plate rib. A pair of longitudinal cover ribs extend upward from the cover proximate the longitudinal base plate ribs. A directional guide member extends from the base plate and below the air duct and is configured to direct air flowing through the air duct rearwardly and toward the longitudinal center line of the engine.

In accordance with another aspect of the present ventilation arrangement, an outboard motor comprises a power head having an engine at least partially enclosed within a cowling, a driveshaft housing depending from the power head, and a propulsion unit driven by the engine. The engine has an air induction device positioned toward a front end of the engine and a protective cover positioned atop the engine. The cowling has an air inlet positioned at an upper rear end of the power head and an air guide positioned between the air inlet and the engine. The air guide has an air duct. The air duct and engine cover are arranged and configured to define a flow path of air from the air inlet through the duct and toward a rear end and a longitudinal center region of the engine. The engine air induction device is configured to draw air from the rear end of the engine across at least one side of the engine and into the induction device through an induction inlet.

In accordance with yet another aspect, the present ventilation arrangement includes an outboard motor comprising a power head having an engine substantially enclosed within a cowling, a driveshaft housing depending from the power head, and a propulsion device driven by the engine. The engine has an air intake device having at least one air intake inlet positioned at a front end of the engine. The cowling has an air inlet formed at an upper and rear portion of the cowling. An air guide member is positioned between the air inlet and the engine. An air duct is formed through the air guide member. The air duct defines an air flow path therethrough. An air directing member depends from the air guide member and extends across a forward portion of the air flow path downstream of the air duct. The directing member is configured to direct air flow rearwardly from the air duct.

In accordance with still another aspect of the present ventilation arrangement, an outboard motor is provided comprising a power head having an engine at least partially enclosed within a cowling, a driveshaft housing depending from the power head, a propulsion unit driven by the engine. The engine has an air induction device positioned toward a front end of the engine and a protective cover disposed over an upper surface of the engine. The cowling has an air inlet at an upper rear end of the power head and an air guide positioned between the air inlet and the engine Means are provided for directing air along a flow path through the air guide and between the air guide and the protective cover to a rear end of the engine, and further across at least one side of the engine to the air induction device.

In accordance with still a further aspect, the present ventilation arrangement includes an outboard motor comprising a power head having an engine at least partially enclosed within a cowling, a driveshaft housing depending from the power head, a propulsion unit driven by the engine. The engine has an air induction device having an induction inlet positioned at a front end of the engine and a protective cover atop the engine. The cowling has an air inlet at an upper and rear portion of the cowling. An air guide member is disposed between the air inlet and the engine. An air duct is formed through the air guide member. The air duct is configured to direct air flowing therethrough toward a rear of the engine. The cover has an upwarly-extending rib having a front portion disposed forwardly of the air duct and an aperture formed through the cover forwardly of the rib. The engine has a lubrication system comprising an oil tank and an oil filling tube. The filling tube extends through the aperture and has a filling port positioned above the cover and forwardly of the rib.

These and other aspects of the present invention will become readily apparent to those skilled in the art from the following detailed description of the preferred embodiments, which refers to the attached figures. The invention is not limited, however, to the particular preferred embodiment that is disclosed.

BRIEF DESCRIPTION OF THE DRAWINGS

These and other features, aspects and advantages of the present invention will now be described with reference to the drawings of a preferred embodiment, which is intended to illustrate and not to limit the invention. The drawings comprise six figures.

DETAILED DESCRIPTION OF THE PREFERRED EMBODIMENT

Figure 1:
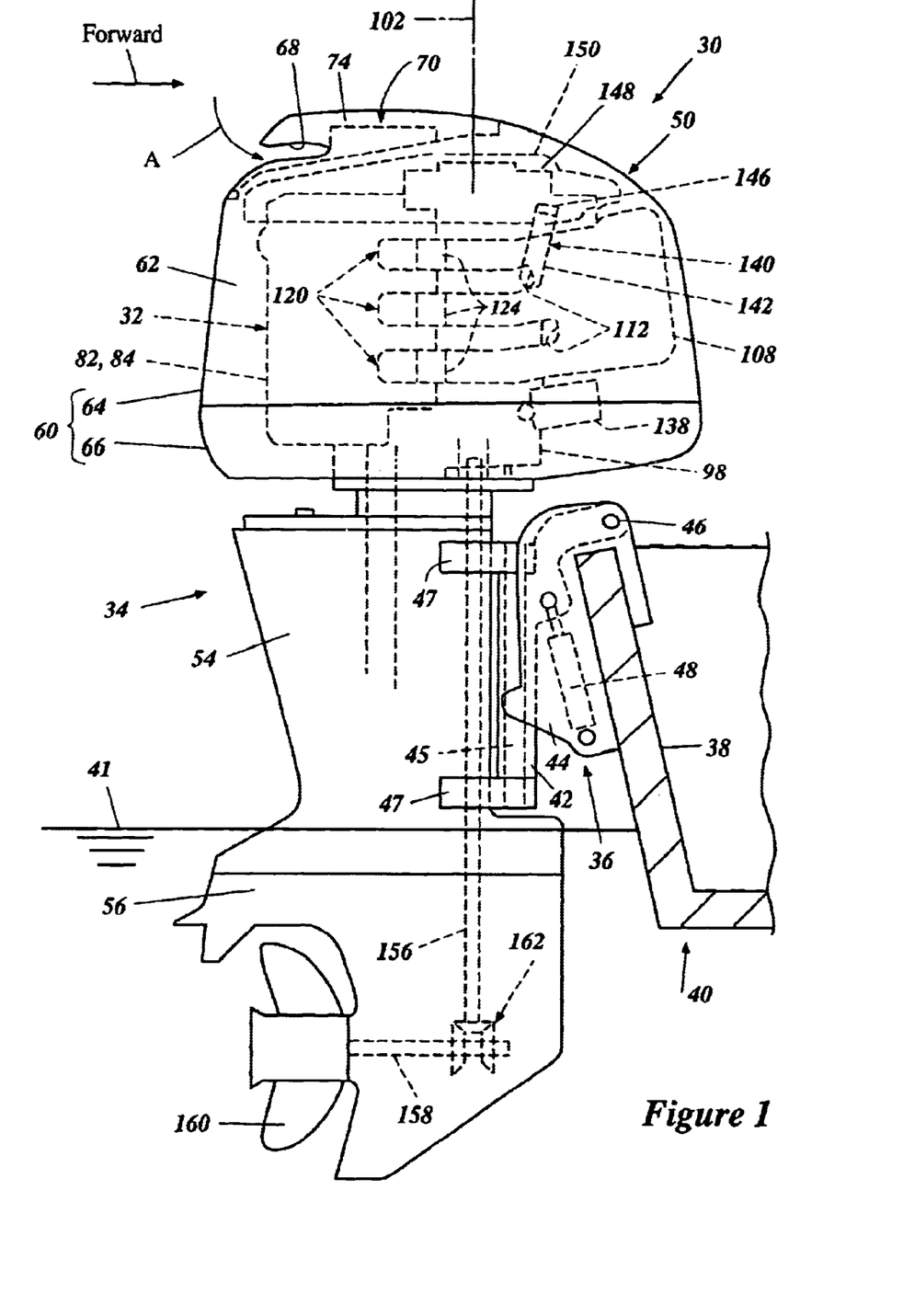
FIG. 1 is a side elevational view of an outboard motor configured in accordance with a preferred embodiment of the present ventilation arrangement.
Figure 2:
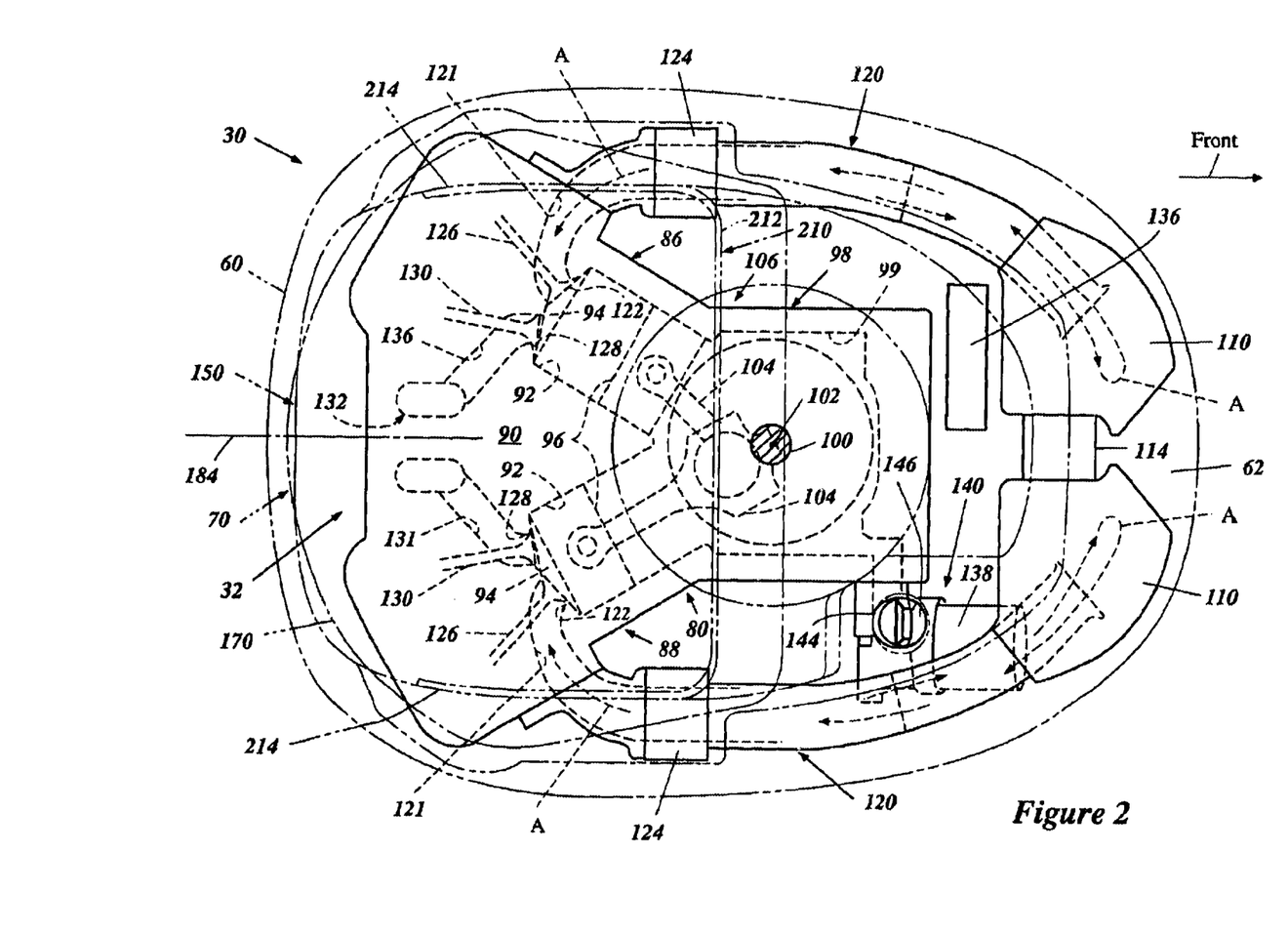
FIG. 2 is a top plan view of a power head of the outboard motor of FIG. 1 showing a cowling and an engine cover in phantom and also showing certain engine components in phantom.

With reference first to FIGS. 1 and 2, an overall construction of an outboard motor 30 that employs a ventilation and air supply arrangement configured in accordance with certain features, aspects and advantages of the present invention will be described. The ventilation arrangement has particular utility in the context of a marine drive such as an outboard motor, and thus is described in the context of an outboard motor. Principles of the arrangement, however, can be used with other types of marine drives.

In the illustrated arrangement, the outboard motor 30 comprises an engine 32, a drive unit 34 and a bracket assembly 36. The bracket assembly 36 supports the drive unit 34 on a transom 38 of an associated watercraft 40 and places a marine propulsion device in a submerged position when the watercraft 40 is resting on the surface 41 of a body of water. The bracket assembly 36 preferably comprises a swivel bracket 42, a clamping bracket 44, a steering shaft 45 and a pivot pin 46.

The steering shaft 45 typically extends through the swivel bracket 42 and is affixed to the drive unit 34 by top and bottom mount assemblies 47. The steering shaft 45 is pivotally journaled for steering movement about a generally vertically extending steering axis defined within the swivel bracket 42. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used throughout this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system 48 preferably is provided between the swivel bracket 42 and the clamping bracket 44 for tilt movement (raising or lowering) of the swivel bracket 42 and the drive unit 34 relative to the clamping bracket 44. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 50, a driveshaft housing 54 and a lower unit 56. The power head 50 is disposed atop the driveshaft housing 54 and includes an internal combustion engine 32 that is positioned within a protective cowling 60 that preferably is made of plastic. Preferably, the protective cowling 60 defines a generally enclosed cavity or engine compartment 62 in which the engine 32 is disposed. The protective cowling assembly 60 preferably comprises a top cowling member 64 and a bottom cowling member 66. The top cowling member 64 preferably is detachably affixed to the bottom cowling member 66 by a coupling mechanism so that a user, operator, mechanic or repair person can access the engine 32 for maintenance or for other purposes.

The top cowling member 64 preferably has a rear air inlet 68 formed on its rear and top portion. An air guide member 70 with an air duct 72 (see FIG. 4) is affixed to the top cowling member 64. An air intake chamber 74 is defined between the air guide member 70 and the rear top portion of the top cowling member 64. The air guide member 70 will be discussed in greater detail below.

The engine 32 is placed onto a tray portion of the power head 50. The tray portion has an opening through which burnt charges (e.g., exhaust gases) from the engine 32 are discharged. The engine in the illustrated embodiment is of the six cylinder, four-cycle variety and is arranged with its cylinders in a "V" fashion. In this arrangement, the engine 32 has a cylinder block 80 (see FIG. 2) having a first cylinder head assembly 82 and a second cylinder head assembly 84 (see FIG. 1) connected thereto and cooperating therewith to define first and second cylinder banks 86, 88 (see FIG. 2).

The cylinder banks 86, 88 define a valley 90 between them. The valley 90 faces away from the watercraft 40 to which the motor is attached. Each bank 86, 88 preferably defines three generally horizontally disposed cylinders 92 which are generally vertically spaced from one another. Each cylinder 92 has a combustion chamber 94 defined in the space between the cylinder 92, its corresponding cylinder head assembly 82, 84, and a piston 96, which is moveably positioned in the cylinder 92.

As used in this description, the term "horizontally" means that the subject portions, members or components extend generally parallel to the water line 41 when the drive unit 34 is not tilted and is placed in the position shown in FIG. 1. The term "vertically" means that portions, members or components extend generally normal to those that extend horizontally.

A crankcase member 98 closes the end of the cylinders opposite the cylinder head to define a crankcase chamber 99 (see FIG. 2) together with the cylinder block 80. A crankshaft or output shaft 100 extends generally vertically through the crankcase chamber 99 about a crankcase axis 102 and is jounaled for rotation by several bearing blocks in any suitable manner. Connecting rods 104 couple the crankshaft 100 with the respective pistons 96 in a well-known manner. Thus, the crankshaft 100 can rotate with the reciprocal movement of the pistons 96.

Preferably, the crankcase member 98 is located at the forwardmost position, with the cylinder block 80 and the cylinder head members 82, 84 extending rearward from the crankcase member 98. Generally, the cylinder block 80, the cylinder head assemblies 82, 84 and the crankcase member 98 together define an engine body 106. Preferably, at least these major engine portions 80, 82, 84, 98 are made of an aluminum alloy. The aluminum alloy advantageously increases strength over cast iron while decreasing the weight of the engine body 106.

The illustrated engine merely exemplifies one type of engine that can be used in combination with certain aspects and features of the present ventilation arrangement. Engines having other number of cylinders, having other cylinder arrangements (e.g., an in-line arrangement), and operating on other combustion principles (e.g., crankcase compression two-stroke or rotary) also can be used.

The engine comprises an air induction system or device 108. The air induction system draws air from within the engine compartment 62 into the combustion chambers. With more specific reference to FIGS. 1 and 2, a pair of plenum chambers 110 are provided at the front end of the engine 32. Each plenum chamber 110 has at least one air inlet 112 for drawing air from within the engine compartment 62 defined by the cowling 60. The plenum chambers 110 are preferably connected via a connecting pipe 114.

Three intake ducts 120 extend rearwardly from each plenum chamber 110. The intake ducts 120 extend along the sides of the engine 32 toward corresponding intake passages 121, which are formed in the cylinder head assemblies. The intake passages 121 lead to intake ports 122. A throttle body 124 is provided along each intake duct 120 between the plenum chamber 110 and the intake port 122.

Air within the engine compartment 62 is drawn into the plenum chambers 110 through the air inlets 112 and is coordinated in the plenum chambers 110 before flowing through the respective intake ducts 120. The plenum chambers 110 also function as intake silencers.

The intake ports 122 are defined in the cylinder head assembly 82, 84. Intake valves 126 are slideably disposed in the cylinder head assembly 82, 84 to move between an open position and a closed position. When each intake valve 126 is in the open position, the intake passage 121 that is associated with the intake port 122 communicates with the associated combustion chamber 94. The valves are driven between the open and closed positions in any suitable manner.

Each throttle body 124 has a throttle valve journaled for pivotal movement about an axis of a valve shaft that extends generally vertically. The valve shaft preferably links all of the valves on each side of the engine so as to move them simultaneously. The valve shaft is operable by the watercraft operator through an appropriate conventional throttle valve linkage. The throttle valves are movable between an open position and a closed position to measure or regulate an amount of air flowing through the respective air intake ducts 120. Normally, the greater the opening degree, the higher the rate of airflow and the higher the engine speed.

The engine 32 also includes an exhaust system that routes burnt charges, i.e., exhaust gases, to a location outside of the outboard motor 30. Each cylinder 92 preferably has an exhaust port 128 defined in the associated cylinder head member 82, 84. The exhaust ports 128 are selectively opened and closed by exhaust valves 130. The exhaust valves 130 are substantially the same as the intake valves 126. An exhaust passage 131 is formed in the cylinder head assembly 82, 84 in communication with associated the exhaust port 128. An exhaust manifold 132 preferably is formed next to the exhaust passages 131 and extends generally vertically. The exhaust manifold 132 communicates with the combustion chambers 94 through the exhaust ports 128 and the exhaust passages 131 to collect exhaust gases therefrom.

The engine 32 also preferably has a charge forming system for supplying a charge of fuel to the combustion chamber 94. The charge former can be of any of a variety of suitable systems, such as a manifold fuel injection system, a direct cylinder injection system, a carbureted fuel delivery system, or the like.

The engine 32 further comprises an ignition or firing system. Each combustion chamber 94 is provided with a spark plug that is connected to an electronic control unit (ECU) 136. The ECU 136 processes electronic inputs from sensors associated with various engine components and controls certain engine systems, such as the ignition system, based on such inputs. The spark plug is connected to the ECU 136 through an igniter so that ignition timing can be controlled by the ECU. Each spark plug makes a spark to ignite an air/fuel charge in the combustion chamber 94 at selected ignition timing under control of the ECU 136.

In the illustrated engine 32, the pistons 96 reciprocate between top dead center and bottom dead center. When the crankshaft 100 makes two rotations, the pistons 96 generally move from top dead center to bottom dead center (the intake stroke), from bottom dead center to top dead center (the compression stroke), from top dead center to bottom dead center (the power stroke) and from bottom dead center to top dead center (the exhaust stroke).

Generally, during the intake stroke, air is drawn into the combustion chambers 94 through the air intake passages 120 and fuel is added to the air. The air and the fuel thus are mixed to form the air/fuel charge in the combustion chambers 94. Slightly before or during the power stroke, the respective spark plugs ignite the compressed air/fuel charge in the respective combustion chambers 94. The air/fuel charge thus furiously burns during the power stroke to reciprocate the pistons 96. The burnt charges, i.e., exhaust gases, then are discharged from the combustion chambers 94 during the exhaust stroke.

During engine operation, heat builds in the engine body 106. The engine 32 thus includes a cooling system to cool the engine body 106. The outboard motor 30 preferably employs an open-loop type water cooling system that introduces cooling water from the body of water surrounding the motor 30 and then discharges the water back to the water body. The cooling system includes one or more water jackets defined within the engine body 106 through which the introduced water runs to remove heat from the engine body 106.

The engine 32 also preferably includes a lubrication system. Although many types of lubrication systems can be applied, a closed-loop type system is employed in the illustrated embodiment. The lubrication system comprises a lubricant tank defining a reservoir cavity preferably positioned within the driveshaft housing 54. An oil pump is provided at a desired location, such as atop the driveshaft housing 54, to pressurize the lubricant oil and to pass the lubricant oil through a suction pipe toward engine portions, which are lubricated through lubricant delivery passages. The engine portions that need lubrication include, for example, the crankshaft bearings, the connecting rods 104 and the pistons 96. An oil filter 138 is provided to filter impurities out of the lubricant.

Oil can be added to the system through an oil filling unit 140 that communicates with the lubricant tank. The oil filling unit 140 includes a filling tube 142 which extends upwardly and terminates at a filling port 144 at an upper end of the tube. A removable cap 146 is configured to selectively close the filling port 144.

A flywheel assembly 148 preferably is positioned atop the crankshaft 100 and is mounted for rotation with the crankshaft 100. The flywheel assembly 148 comprises a flywheel magneto or AC generator that supplies electric power to various electrical components such as the fuel injection system, the ignition system and the ECU.

A protective cover 150 (see also FIG. 3), which preferably is made of plastic, extends over a substantial portion of the upper surface of the engine 32. The protective cover 150 is arranged between the air guide member 70 and the engine 32. A raised portion 152 of the cover 150 accommodates the spinning flywheel 148, which rotates about the center axis 102 of the crankshaft 100. The protective cover 150 is arranged and configured to cooperate with the air guide 70 so as to direct intake air toward a rear end of the engine 32 and to help separate water that may be entrained in the air. More details about the protective cover 150 and the air guide 70 will be discussed below.

With reference again to FIG. 1, the driveshaft housing 54 depends from the power head 50 and supports a driveshaft 156, which is coupled with the crankshaft 100 and which extends generally vertically through the driveshaft housing 54. The driveshaft 156 is journaled for rotation and is driven by the crankshaft 100. The driveshaft housing 54 preferably defines an internal section of the exhaust system that directs the majority of exhaust gases from the exhaust manifold to the lower unit 56.

The lower unit 56 depends from the driveshaft housing 54 and supports a propulsion shaft 158 (see FIG. 1) that is driven by the driveshaft 156. The propulsion shaft 158 extends generally horizontally through the lower unit 56 and is journaled for rotation. A propulsion device is attached to the propulsion shaft 158. In the illustrated arrangement, the propulsion device is a propeller 160 that is affixed to an outer end of the propulsion shaft 158. The propulsion device, however, can take the form of a dual counter-rotating system, a hydrodynamic jet, or any of a number of other suitable propulsion devices.

A transmission 162 preferably is provided between the driveshaft 156 and the propulsion shaft 158, which lie generally normal to each other (i.e., at a 90° shaft angle), to couple together the two shafts 156, 158 through bevel gears. The outboard motor 30 has a clutch mechanism that allows the transmission 162 to change the rotational direction of the propeller 160 among forward, neutral or reverse.

The lower unit 56 also defines an internal section of the exhaust system that is contiguously connected with the internal section of the driveshaft housing 54. At engine speeds above idle, the exhaust gases generally are discharged to the body of water surrounding the outboard motor 30 through the internal sections and then a discharge section defined within the hub of the propeller 160. Incidentally, the exhaust system can include a catalytic device at any suitable location in the exhaust system to purify the exhaust gases.

Figure 4:
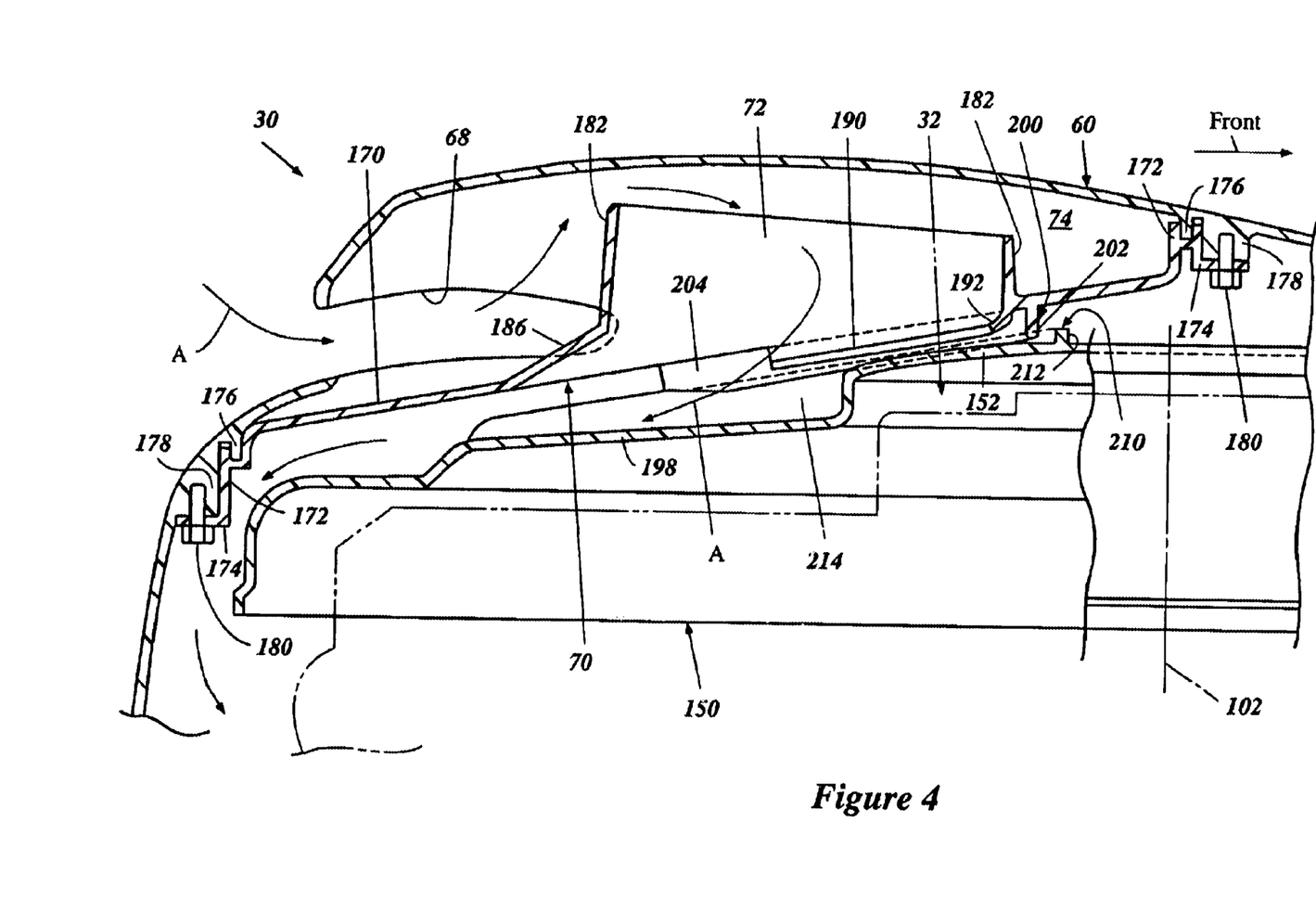
FIG. 4 is a partial cross-sectional side view of an upper rear portion of the outboard motor of FIG. 1.
Figure 5:
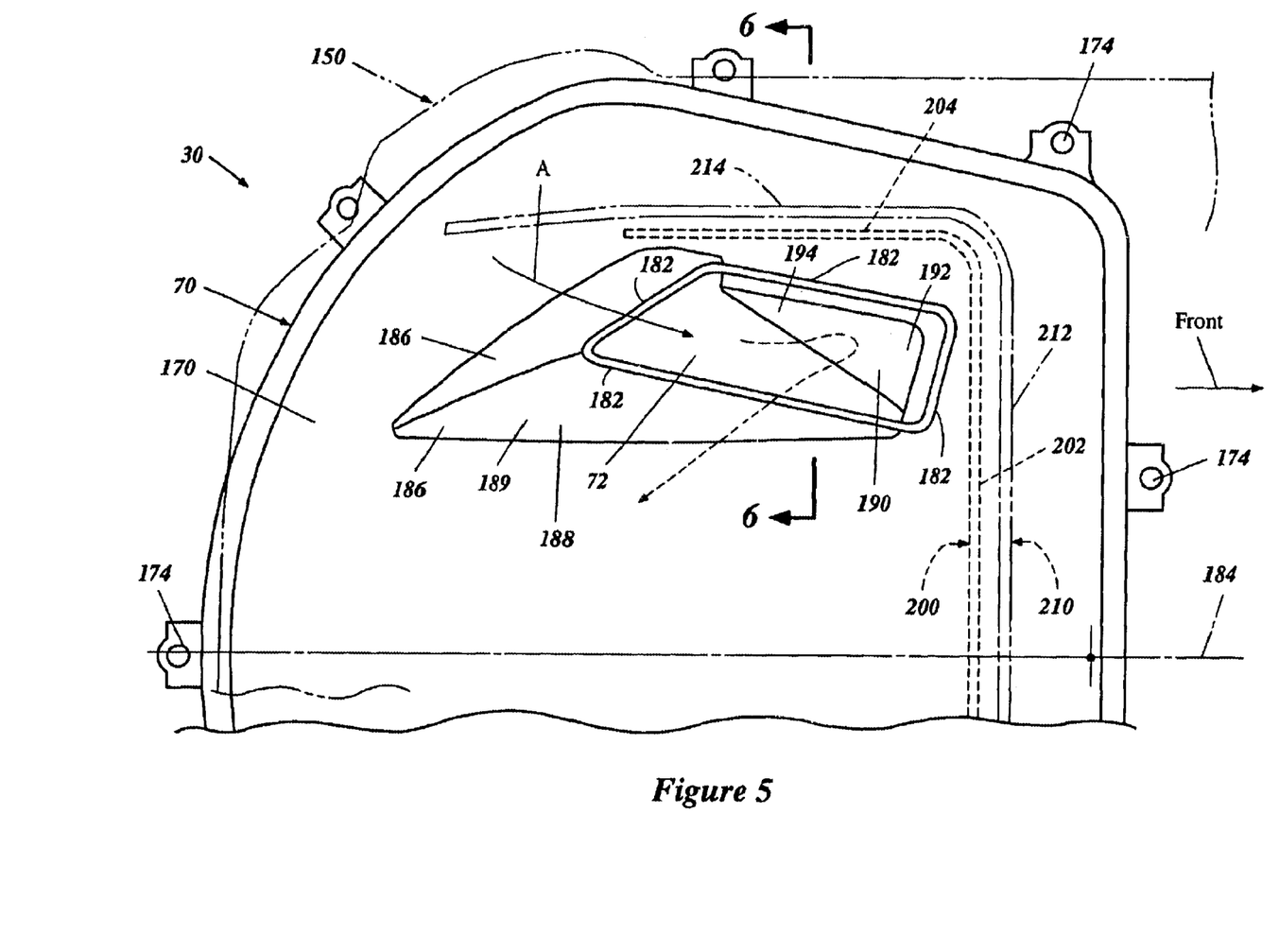
FIG. 5 is a partial top view of an air guide member configured in accordance with a preferred embodiment of the present ventilation arrangement.
Figure 6:
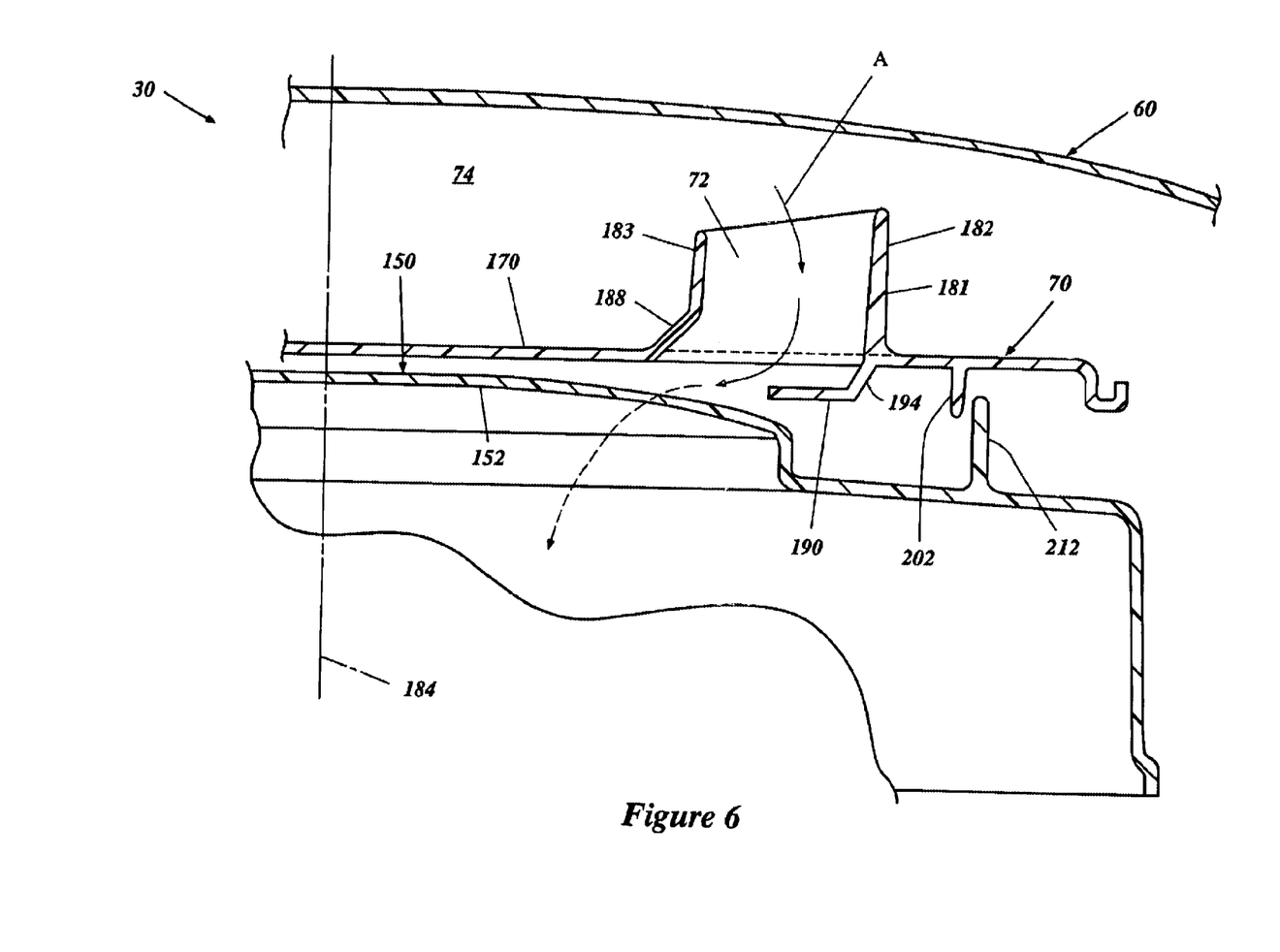
FIG. 6 is a partial cross-sectional front view of the ventilation arrangement of the preferred embodiment taken along line 6—6 of FIG. 5.

With reference next to FIGS. 4–6, the air guide member 70 comprises a base plate 170 which is positioned between the air inlet 68 and the engine cover 150. A peripheral edge of the base plate 170 comprises a sealing edge 172 having a plurality of mount flanges 174 extending therefrom. A corresponding sealing member 176 is provided on the inside surfaces of the cowling walls and is configured to sealingly engage the edge 172 of the base plate 170. The base plate mount flanges 174 engage corresponding mount bosses 178 that extend from the inner surface of the cowling walls. Fasteners 180 extending through the mount bodies 174 and into the mount bosses 178 to hold the base plate 170 in place relative to the cowling 60. In this manner, the air guide member 70 defines an air inlet chamber 74 which is divided from the engine compartment 62.

The air duct 72 extends through the base plate 170 to allow air A to flow from the inlet chamber 74 into the engine compartment 62. The air duct 72 comprises a plurality of air duct walls 182 that extend upwardly from the base plate 170. Preferably, the upper end of the air duct 72, which is defined by these walls 182, is vertically higher than the upper edge of the air inlet 68. In this manner, water that may splash through the air inlet 68 will advantageously contact the upwardly extending air duct walls 182 and will be deflected so as not to travel through the air duct 72. Additionally, air A that enters the air inlet chamber 74 through the inlet opening 68 must flow upwardly over the air duct walls 182 and then downwardly through the air duct 72 in order to flow through the air guide 70. Guiding the intake air A through this tortuous path forces the air to change direction and will cause much of the water that may be entrained in the air to fall out of the air. The water will then flow along the base plate 170 and out of the cowling 60 through a drain or other suitable arrangement.

With specific reference to FIG. 6, the air duct walls 182 preferably are configured so that the upper end of the air duct 72 is vertically higher along an outer side 181 of the air duct 72 than along an inward side 183 of the air duct 72.

In the illustrated embodiment, the air intake duct 72 is positioned toward the port side of the motor relative to a longitudinal center line 184 of the motor. It is to be understood that, in some embodiments, a single air duct is provided and is positioned as shown. However, it is also to be understood that another air duct may be provided toward the starboard side of the longitudinal center line. Most preferably, the air guide member 70 includes at least a pair of air ducts 72 that are configured and arranged substantially symmetrically about the longitudinal center line 184.

With specific reference to FIGS. 4 and 5, some of the upwardly extending air duct walls 182 include rearwardly inclined portions 186 wherein the wall 182 is angled toward the rear of the motor. This arrangement encourages the flowing air A to flow toward the rear of the engine compartment 62 after it has entered the air duct 72. Of course, before the air enters the air duct 72, the inclined angle moves the air upward while allowing separated water to flow downward and out of the cowling.

With specific reference to FIGS. 5 and 6, at least some of the upwardly extending air duct walls 182 have inwardly inclined portions 188 wherein a portion of the wall is inclined toward the longitudinal center line 184 of the motor. This arrangement encourages air A to flow toward the center 184 of the engine 32. With specific reference to FIG. 5, at least some wall portions 189 are both rearwardly and inwardly inclined. Thus, air A is directed both rearwardly and toward the center line 184 of the engine 32.

With reference again to FIGS. 4–6, a directing member 190 extends downwardly and inwardly from the base plate 170. The directing member 190 has a portion 192 extending along the front side of the air duct 72 and a portion 194 extending along the port side of the air duct 172. This member 190 also slopes downward to the rear and starboard. In the illustrated embodiment, the port side is the outer side of the air duct 72 relative to the longitudinal center line 184. As shown particularly in FIG. 5, the directing member 190 occludes a flow path downstream of the air duct 72 toward a front and outer side thereof. Thus, the directing member 190 operates to further direct air A rearwardly and inwardly. It is to be understood that the directing member 190 can have various shapes and sizes so as to emphasize direction of intake air towards the rear, to the side, or both.

Figure 3:
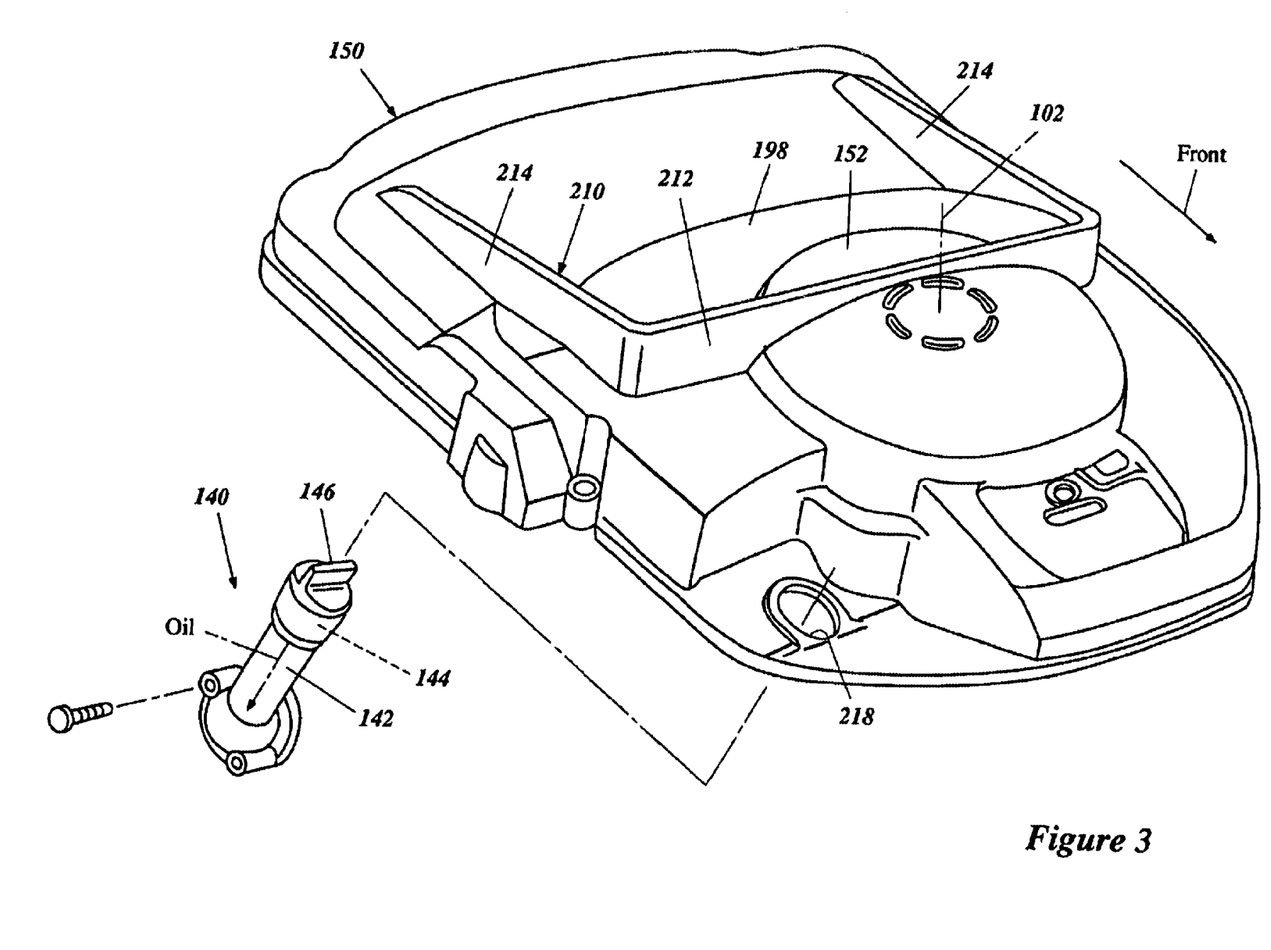
FIG. 3 is a perspective view of the engine cover of FIG. 2.

With reference also to FIG. 3, and as discussed above, the air guide member 70 and the engine protective cover 150 cooperate to further direct intake air as desired to minimize water intrusion. Air A that flows through the air duct 72 is directed onto a downwardly sloped surface 198 of the engine cover 150 and toward the rear and longitudinal center 184 of the engine 32. As discussed above, as the air flow A changes direction, water that may be entrained in the air tends to fall out of the air. Water that falls out of the air while the air flows through the duct 72 and water that may splash through the air inlet 68 over the upwardly extending duct walls 182 and through the air duct 72 will tend to deposit upon the protective cover 150, from which it will be directed rearwardly and away from the throttle bodies 124, the air intake system (i.e., the plenum chambers 110) and other sensitive components.

The air guide base plate 170 additionally comprises a downwardly extending rib 200 which has a front portion 202 positioned in front of the air duct 72 and side portions 204 which extend along both sides of the air duct 72. As shown specifically in FIGS. 5 and 6, the side rib portion 204 along the port side of the base plate 170 is substantially adjacent the port air duct 72. The side rib portion 204 along the starboard side of the base plate 170 is preferably configured and positioned symmetrically about the longitudinal center line 184 relative to the port side rib. Preferably, the side and front portions 204, 202 of the rib collectively define a substantially continuous rib 200.

The cover 150 has an upwardly extending rib 210 that also has front and side portions 212, 214. The cover rib 210 is configured so that when the cowling 60 is installed over the engine 32, as shown in FIGS. 4–6, the cover rib 210 is positioned substantially adjacent the air guide rib 200, with the cover rib front portion 212 being in front of the air guide rib front portion 202 and the cover rib side portions 214 being positioned toward the outer side of the air guide rib side portions 204 in the illustrated arrangement. Of course, this configuration can be reversed in some arrangements.

The downwardly extending air guide rib 200 and the upwardly extending cover rib 210 cooperate to create yet another barrier to air flow toward the sides and front of the engine 32. These adjacent ribs further direct air A toward the center and rear of the engine 32. However, it is possible for a small amount of air to flow between the ribs 200, 210. Such air flow will, of necessity, make dramatic turns as it follows the tortuous path between the adjacent ribs. As discussed above, water that may still be entrained in the air will likely fall out of the air while following this pathway. Thus, the air that may flow between and past the ribs 200, 210 will likely have a low water content and/or will be substantially free of water.

The above-described air intake arrangement provides a number of advantages. For example, because the flow of air A must make many dramatic turns to enter the engine compartment 62, water than may be entrained in the air A is likely to fall out of the air before reaching any engine components or the air induction system 108. Additionally, splashes of water that may splash through the cowling inlet 68 will likely be prevented from entering the cowling cavity 62, and splashes that do enter the cavity 62 will likely be collected on the protective cover 150 and communicated away from the engine 32 and other sensitive engine components.

Directing intake air toward the center line 184 and rear of the engine 32 and orienting the engine air induction device 108 at the front of the engine 32 forces intake air A to follow a relatively long flow path before being inducted into the engine. This long path provides further opportunity for water that may be entrained in the air to fall out of the air. Thus, by making the air path from the cowling air inlet 68 toward the engine induction system 108 tortuous and long, reduction of water content and corresponding reduction of corrosion of internal engine components is achieved.

Since intake air A must travel from the center of the rear end of the engine 32 and along the sides of the engine to the air induction device 108, which is located at the front end of the engine, the flow of air will act to cool engine components that are arranged along the sides of the engine. Also, by removing as much water as possible by directing air toward the rear of the engine 32 before allowing any air to flow across the sides of the engine 32, the contact of corroding water with vital engine components, such as the throttle bodies 124, is minimized.

With reference specifically to FIG. 3, an aperture 218 is formed through the protective cover 150 toward a front of the engine 32. The oil filling tube 142 of the oil filling unit 140 extends into this aperture 218 so that the filling port 144 is accessible from above the cover 150. This arrangement provides for easy maintenance, because the oil filling port 144 is convenient to access when the cowling 60 is removed. Thus, it is easy for a user to add oil when necessary. Also, since the oil filling port 144 is arranged forwardly of the air duct 70, forwardly of the ribs 200, 210, and at an upper end of the engine 32, air flow across the filling port 144 is minimized, and air that may flow across the port 144 likely has most, if not all, of the entrained water removed therefrom. In this manner, the cowling intake arrangement and the component arrangement helps to minimize corrosion that may occur from water invading the lubrication system through the oil filling port 144.

Although this invention has been disclosed in the context of a certain preferred embodiment and other examples, it will be understood by those skilled in the art that the present invention extends beyond the specifically disclosed embodiment to other alternative embodiments and/or uses of the invention and obvious modifications and equivalents thereof. In addition, while a number of variations of the invention have been described in detail, other modifications, which are within the scope of this invention, will be readily apparent to those of skill in the art based upon this disclosure. It is also contemplated that various combinations or subcombinations of the specific features and aspects of the disclosure may be made and still fall within the scope of the invention. Accordingly, it should be understood that various features and aspects of the disclosure can be combined with or substituted for one another in order to form varying modes of the disclosed invention. Thus, it is intended that the scope of the present invention herein disclosed should not be limited by the particular disclosed embodiment described above, but should be determined only by a fair reading of the claims that follow.

What is claimed is:

1. An outboard motor comprising a cowling substantially enclosing an internal combustion engine, the engine comprising an air intake system having an intake opening disposed near a front end of the engine, an engine cover disposed above an upper end of the engine, the cowling having an air inlet formed through an upper rear end of the cowling and an air guide member comprising a base plate disposed between the air inlet and the engine cover, the base plate having an air duct extending therethrough, the air duct being offset from a longitudinal center line of the engine and opening above the engine cover, a transverse base plate rib extending downward from the base plate at a location forward of the air duct, a pair of longitudinal base plate ribs extending downward from the base plate and being connected to the transverse base plate rib such that the air duct is interposed therebetween, a transverse cover rib extending upward from the cover proximate the transverse base plate rib, and a pair of longitudinal cover ribs extending upward from the cover proximate the longitudinal base plate ribs, and a directional guide member extending from the base plate, the directional guide member extending below the air duct and configured to direct air flowing through the air duct rearwardly and toward the longitudinal center line of the engine.

2. The outboard motor of claim 1, wherein the transverse base plate rib and the longitudinal base plate ribs form a first generally U-shaped rib and the transverse cover rib and the longitudinal cover ribs form a second generally U-shaped rib, and the second U-shaped rib lies outwardly from the first U-shaped rib.

3. The outboard motor of claim 1, wherein the longitudinal center line is interposed between the longitudinal base plate ribs.

4. The outboard motor of claim 1, wherein the cover additionally comprises a downwardly sloped portion rearwardly of the transverse cover rib.

5. The outboard motor of claim 1, wherein the engine comprises a four cycle engine having a lubrication system, the lubrication system having an oil filling unit comprising an oil filling tube, and the oil filling tube extending through the engine cover at a position forwardly of the transverse cover rib.

6. The outboard motor of claim 1, wherein the cover rib and base plate rib are both substantially symmetrical about the longitudinal axis of the engine.

7. The outboard motor of claim 1, additionally comprising a second air duct offset from the longitudinal axis of the engine opposite the first air duct, and the air ducts are substantially symmetrical about the axis.

8. The outboard motor of claim 1, wherein the air duct is defined by a plurality of walls, and at least some of the walls slope rearwardly so as to direct air flowing downward through the air duct towards the rear of the engine.

9. The outboard motor of claim 8, wherein at least one of the walls slopes inwardly toward the longitudinal center line.

10. The outboard motor of claim 9, wherein at least one of the walls slopes both inwardly and rearwardly.

11. An outboard motor comprising a power head having an engine at least partially enclosed within a cowling, a driveshaft housing depending from the power head, and a propulsion unit driven by the engine, the engine having an air induction device positioned toward a front end of the engine and a protective cover positioned atop the engine, the cowling having an air inlet positioned at an upper rear end of the power head and an air guide positioned between the air inlet and the engine, the air guide having an air duct, the air duct and engine cover arranged and configured to define a flow path of air from the air inlet through the duct and toward a rear end and a longitudinal center region of the engine, and the engine air induction device being configured to draw air from the rear end of the engine along at least one side of the engine so as to contact and cool the engine, and into the induction device through an induction inlet.

12. The outboard motor of claim 11, wherein the air duct is positioned toward a first side of a longitudinal center line of the engine, and the air duct comprises a plurality of walls, at least one of the walls having a rearwardly and inwardly inclined portion configured to conduct air flow rearwardly toward the rear end of the engine and inwardly toward a longitudinally extending center plane.

13. The outboard motor of claim 12, wherein the air guide comprises a downwardly-extending rib having a front portion positioned forwardly of the air duct, a first side portion positioned on a side of the air duct away from the center line, and a second side portion positioned on an opposite side of the air duct from the first side portion.

14. The outboard motor of claim 13, wherein the second side portion is positioned on an opposite side of the center plane from the first side portion.

15. The outboard motor of claim 13, wherein the protective cover comprises an upwardly-extending rib having a front portion positioned forwardly of the air duct rib front portion and having side portions positioned adjacent the air guide rib side portions on a side away from the center line.

16. The outboard motor of claim 15, wherein the air guide rib and cover rib are positioned adjacent to each other so that a tortuous air flow path is defined between the ribs.

17. The outboard motor of claim 11, wherein the air duct is positioned toward a first side of a longitudinal center plane of the engine, the air duct comprises a plurality of upwardly extending walls, and an upper end of the air duct is vertically higher than an upper edge of the air inlet.

18. The outboard motor of claim 11, wherein the air duct is positioned toward a first side of a longitudinal center plane of the engine, the air duct comprises a plurality of upwardly extending walls, and the upper end of the air duct along an outer side of the air duct is vertically higher than the upper end of the air duct along an inward side of the air duct.

19. The outboard motor of claim 18, wherein the upper end of the air duct along the outer side of the air duct is closer to an upper wall of the cowling than is the upper end of the air duct along the inward side of the air duct.

20. The outboard motor of claim 11, wherein a directing member depends from the air guide on a downstream side of the air duct, and the directing member partially occludes a portion of the downstream side of the air duct so as to direct air toward a non-occluded portion of the air duct.

21. The outboard motor of claim 11, wherein the engine comprises a lubrication system having a lubricant tank and a lubricant filling tube communicating with the tank, the lubricant filling tube having a filling port selectively closeable by a removable cap, and an aperture is formed through the engine cover forwardly of the air duct, wherein the filling tube extends into the aperture so that the filling port is positioned for access from above the cover and forwardly of the air duct.

22. An outboard motor comprising a power head having an engine substantially enclosed within a cowling, a driveshaft housing depending from the power head, and a propulsion device driven by the engine, the engine having an air intake device having at least one air intake inlet positioned at a front end of the engine, the cowling having an air inlet formed at an upper and rear portion of the cowling, an air guide member between the air inlet and the engine, an air duct formed through the air guide member, the air duct defining an air flow path therethrough, and an air directing member depending from the air guide member and extending across a forward portion of the air flow path downstream of the air duct, the directing member configured to direct air flow rearwardly from the air duct.

23. The outboard motor of claim 22, wherein the air duct comprises a plurality of walls, and at least one of the walls has a rearwardly inclined portion configured to help direct air flow rearwardly.

24. The outboard motor of claim 22, wherein the directing member extends across a first side portion of the air flow path downstream of the air duct, and the directing member is configured to direct air flow toward a second side direction.

25. The outboard motor of claim 24, wherein the air duct comprises a plurality of walls, and at least one of the walls has a portion that is inclined rearwardly and sidewardly so as to direct air flow in a direction both rearward and sideways.

26. The outboard motor of claim 25, wherein the air duct is positioned toward a first side of a longitudinal center line of the engine, and the sidewardly inclined portion directs air toward the center line.

27. An outboard motor comprising a power head having an engine at least partially enclosed within a cowling, a driveshaft housing depending from the power head, a propulsion unit driven by the engine, the engine having an air induction device positioned toward a front end of the engine and a protective cover disposed over an upper surface of the engine, the cowling having an air inlet at an upper rear end of the power head and an air guide positioned between the air inlet and the engine, and means for directing air along a flow path through the air guide and between the air guide and the protective cover to a rear end of the engine, and further along least one side of the engine so as to contact and cool the engine, and to the air induction device.

28. The outboard motor of claim 27, wherein the means comprises an air duct through the air guide and a rib that depends from the air guide and that is disposed generally around the front and sides of the air duct while being generally open rearwardly of the air duct.

29. The outboard motor of claim 28, wherein the engine cover has an upwardly extending rib configured to lie generally adjacent the air guide rib so that a tortuous air flow path is defined between the ribs.

30. An outboard motor comprising a power head having an engine at least partially enclosed within a cowling, a driveshaft housing depending from the power head, a propulsion unit driven by the engine, the engine having an air induction device having an induction inlet positioned at a front end of the engine and a protective cover atop the engine, the cowling having an air inlet at an upper and rear portion of the cowling, an air guide member disposed between the air inlet and the engine, an air duct formed through the air guide member, the air duct configured to direct air flowing therethrough toward a rear of the engine, the cover having an upwardly-extending rib having a front portion disposed forwardly of the air duct and an aperture formed through the cover forwardly of the rib, the engine having a lubrication system comprising an oil tank and an oil filling tube, the filling tube extending through the aperture and having a filling port positioned above the cover and forwardly of the rib.

31. The outboard motor of claim 30 additionally comprising a rib depending from the air guide, the rib having a front portion which lies adjacent the cover rib so that a tortuous air path is defined between the ribs.

32. The outboard motor of claim 31, wherein a directing member extends from a bottom side of the air guide and extends across a front portion of a downstream side of the air duct.

33. An outboard motor comprising a power head having an engine at least partially enclosed within a cowling, a driveshaft housing depending from the power head, and a propulsion unit driven by the engine, the engine having an air induction device positioned toward a front end of the engine and a protective cover positioned atop the engine, the cowling having an air inlet positioned at an upper rear end of the power head and an air guide positioned between the air inlet and the engine, the air guide having an air duct, the air duct and engine cover arranged and configured to define a flow path of air from the air inlet through the duct and toward a rear end and a longitudinal center region of the engine, and the engine air induction device being configured to draw air from the rear end of the engine across at least one side of the engine and into the induction device through an induction inlet, wherein the air duct is positioned toward a first side of a longitudinal center line of the engine, and the air duct comprises a plurality of walls, at least one of the walls having a rearwardly and inwardly inclined portion configured to conduct air flow rearwardly toward the rear end of the engine and inwardly toward a longitudinally extending center plane.

34. An outboard motor comprising a power head having an engine at least partially enclosed within a cowling, a driveshaft housing depending from the power head, and a propulsion unit driven by the engine, the engine having an air induction device positioned toward a front end of the engine and a protective cover positioned atop the engine, the cowling having an air inlet positioned at an upper rear end of the power head and an air guide positioned between the air inlet and the engine, the air guide having an air duct, the air duct and engine cover arranged and configured to define a flow path of air from the air inlet through the duct and toward a rear end and a longitudinal center region of the engine, the air duct being positioned toward a first side of a longitudinal center plane of the engine and comprising a plurality of upwardly extending walls, and an upper end of the air duct is vertically higher than an upper edge of the air inlet, and the engine air induction device being configured to draw air from the rear end of the engine across at least one side of the engine and into the induction device through an induction inlet.

35. The outboard motor of claim 34, wherein the upper end of the air duct along an outer side of the air duct is vertically higher than the upper end of the air duct along an inward side of the air duct.

36. An outboard motor comprising a power head having an engine at least partially enclosed within a cowling, a driveshaft housing depending from the power head, and a propulsion unit driven by the engine, the engine having an air induction device positioned toward a front end of the engine and a protective cover positioned atop the engine, the cowling having an air inlet positioned at an upper rear end of the power head and an air guide positioned between the air inlet and the engine, the air guide having an air duct, the air duct and engine cover arranged and configured to define a flow path of air from the air inlet through the duct and toward a rear end and a longitudinal center region of the engine, the air duct being positioned toward a first side of a longitudinal center plane of the engine and comprising a plurality of upwardly extending walls, and the upper end of the air duct along an outer side of the air duct is vertically higher than the upper end of the air duct along an inward side of the air duct, and the engine air induction device being configured to draw air from the rear end of the engine across at least one side of the engine and into the induction device through an induction inlet.

37. The outboard motor of claim 36, wherein the upper end of the air duct along the outer side of the air duct is closer to an upper wall of the cowling than is the upper end of the air duct along the inward side of the air duct.

38. An outboard motor comprising a power head having an engine at least partially enclosed within a cowling, a driveshaft housing depending from the power head, and a propulsion unit driven by the engine, the engine having an air induction device positioned toward a front end of the engine and a protective cover positioned atop the engine, the cowling having an air inlet positioned at an upper rear end of the power head and an air guide positioned between the air inlet and the engine, the air guide having an air duct and a directing member that depends from the air guide on a downstream side of the air duct, the directing member partially occluding a portion of the downstream side of the air duct so as to direct air toward a non-occluded portion of the air duct, the air duct and engine cover arranged and configured to define a flow path of air from the air inlet through the duct and toward a rear end and a longitudinal center region of the engine, and the engine air induction device being configured to draw air from the rear end of the engine across at least one side of the engine and into the induction device through an induction inlet.

39. The outboard motor of claim 38, wherein the directing member partially occludes an outward portion of the air duct so that air is directed inwardly.

40. The outboard motor of claim 38, wherein the directing member partially occludes a forward portion of the air duct so that air is directed rearwardly.

41. An outboard motor comprising a power head having an engine at least partially enclosed within a cowling, a driveshaft housing depending from the power head, and a propulsion unit driven by the engine, the engine having an air induction device positioned toward a front end of the engine and a protective cover positioned atop the engine, the cowling having an air inlet positioned at an upper rear end of the power head and an air guide positioned between the air inlet and the engine, the air guide having an air duct, the air duct and engine cover arranged and configured to define a flow path of air from the air inlet through the duct and toward a rear end and a longitudinal center region of the engine, and the engine air induction device being configured to draw air from the rear end of the engine across at least one side of the engine and into the induction device through an induction inlet, wherein the engine comprises a lubrication system having a lubricant tank and a lubricant filling tube communicating with the tank, the lubricant filling tube having a filling port selectively closeable by a removable cap, and an aperture is formed through the engine cover forwardly of the air duct, wherein the filling tube extends into the aperture so that the filling port is positioned for access from above the cover and forwardly of the air duct.

42. The outboard motor of claim 41, wherein the engine cover has an upwardly-extending rib having a front portion disposed forwardly of the air duct, and the aperture and filling tube are disposed forwardly of the rib.

43. An outboard motor comprising a power head having an engine at least partially enclosed within a cowling, a driveshaft housing depending from the power head, a propulsion unit driven by the engine, the engine having an air induction device positioned toward a front end of the engine and a protective cover disposed over an upper surface of the engine, the cowling having an air inlet at an upper rear end of the power head and an air guide positioned between the air inlet and the engine, and means for directing air along a flow path through the air guide and between the air guide and the protective cover to a rear end of the engine, and further across at least one side of the engine to the air induction device, wherein the means comprises an air duct through the air guide and a rib that depends from the air guide and that is disposed generally around the front and sides of the air duct while being generally open rearwardly of the air duct.

* * * * *